United States Patent
Geislinger et al.

(10) Patent No.: US 8,813,335 B2
(45) Date of Patent: Aug. 26, 2014

(54) METHOD FOR MANUFACTURING A HOLLOW SHAFT WITH AT LEAST ONE INTEGRAL FLANGE MADE OF FIBER COMPOSITE

(75) Inventors: Cornelius Geislinger, Salzburg (AT); Matthias Geislinger, Salzburg (AT); Christof Sigle, Hallwang (AT)

(73) Assignee: Ellergon Antriebstechnik Gesellschaft m.b.H., Hallwang (AT)

( * ) Notice: Subject to any disclaimer, the term of this patent is extended or adjusted under 35 U.S.C. 154(b) by 674 days.

(21) Appl. No.: 12/484,173

(22) Filed: Jun. 12, 2009

(65) Prior Publication Data

US 2009/0308477 A1    Dec. 17, 2009

(30) Foreign Application Priority Data

Jun. 13, 2008 (DE) .......................... 10 2008 028 337

(51) Int. Cl.
*B23P 17/00* (2006.01)

(52) U.S. Cl.
USPC ................ 29/419.1; 29/819; 29/820; 29/821; 138/109

(58) Field of Classification Search
USPC ......... 29/419.1, 819–821; 138/129, 109, 153, 138/131, 130; 156/171–173, 431, 194; 153/171–173, 194, 431
See application file for complete search history.

(56) References Cited

U.S. PATENT DOCUMENTS

| 3,970,495 | A | * | 7/1976 | Ashton et al. .................. 156/162 |
| 3,977,273 | A | * | 8/1976 | Ernst et al. .................. 74/572.21 |
| 4,023,835 | A | * | 5/1977 | Ewing et al. .................. 285/235 |
| 4,116,018 | A | * | 9/1978 | Weible ............................. 464/56 |
| 4,126,659 | A | * | 11/1978 | Blad ............................. 264/573 |
| 4,236,386 | A | * | 12/1980 | Yates et al. .................... 464/181 |
| 4,288,267 | A | * | 9/1981 | McLarty ....................... 156/175 |
| 4,290,836 | A | * | 9/1981 | McPherson et al. .......... 156/171 |
| 4,335,587 | A | * | 6/1982 | Thomamueller et al. ..... 464/106 |
| 4,348,247 | A | * | 9/1982 | Loyd et al. .................... 156/156 |
| 4,391,594 | A | * | 7/1983 | Hannibal et al. ................ 464/80 |

(Continued)

FOREIGN PATENT DOCUMENTS

| DE | 195 44 008 | 6/1996 |
| DE | 10 2006 042 301 | 3/2008 |

(Continued)

OTHER PUBLICATIONS http://thesaurus.com/browse/stripped; stripped definition; p. 1.*

*Primary Examiner* — David Bryant
*Assistant Examiner* — Bayan Salone
(74) *Attorney, Agent, or Firm* — Myers Wolin, LLC

(57) ABSTRACT

For a method for manufacturing a hollow shaft with at least one integral flange made of fiber composite, a plurality of intersecting windings of fiber material are applied onto a core. Moreover, the core has, for each flange, a radial spreader ring with an axial bearing surface. The windings are laid over an outer circumferential portion of the respective spreader ring and fixed. One or several inserts made of fiber material are inserted in the area of the spreader ring between the windings. The fixing of the wound fiber material is released, but is first still held on the spreader ring. Portions of the windings are then pulled off from the outer circumferential portion of the spreader ring and brought to rest on the axial bearing surface of the spreader ring in order to form a partial portion of a flange.

12 Claims, 4 Drawing Sheets

(56) References Cited

U.S. PATENT DOCUMENTS

| | | | |
|---|---|---|---|
| 4,569,667 A * | 2/1986 | Hannibal et al. | 464/51 |
| 4,577,736 A * | 3/1986 | Bongers et al. | 188/371 |
| 4,762,583 A * | 8/1988 | Kaempen | 156/173 |
| 5,071,506 A * | 12/1991 | Nelson et al. | 156/441 |
| 5,135,596 A * | 8/1992 | Pabsch et al. | 156/156 |
| 5,225,016 A * | 7/1993 | Sarh | 156/156 |
| 5,551,918 A * | 9/1996 | Jones et al. | 464/80 |
| 5,685,933 A * | 11/1997 | Ohta et al. | 156/175 |
| 5,688,347 A * | 11/1997 | Connolly et al. | 156/89.11 |
| 5,725,434 A * | 3/1998 | Haben et al. | 464/181 |
| 6,165,303 A * | 12/2000 | Darby et al. | 156/175 |
| 6,168,527 B1 * | 1/2001 | Geislinger | 464/88 |
| 6,641,693 B2 * | 11/2003 | Guckert et al. | 156/171 |
| 6,692,673 B2 * | 2/2004 | Nakamura | 264/159 |
| 6,843,462 B2 * | 1/2005 | Nakamura | 249/184 |
| 7,677,980 B2 * | 3/2010 | Geislinger et al. | 464/92 |
| 7,996,993 B2 * | 8/2011 | Gray et al. | 29/896.62 |
| 2002/0003004 A1 * | 1/2002 | Guckert et al. | 138/137 |
| 2008/0064510 A1 * | 3/2008 | Geislinger et al. | 464/147 |

FOREIGN PATENT DOCUMENTS

| | | |
|---|---|---|
| EP | 0 443 470 | 8/1991 |
| WO | 98/20263 | 5/1998 |
| WO | WO 9820263 A1 * | 5/1998 |

* cited by examiner

METHOD FOR MANUFACTURING A HOLLOW SHAFT WITH AT LEAST ONE INTEGRAL FLANGE MADE OF FIBER COMPOSITE

This invention claims priority to German Patent Application No. 10 2008 028 337.1, filed Jun. 13, 2008, now pending, the entire contents of which are incorporated herein by reference.

This invention relates to a method for manufacturing a hollow shaft with at least one integral flange made of fiber composite for which a plurality of intersecting windings of fiber material are deposited onto a core. Furthermore, this invention relates to a hollow shaft made of fiber composite.

Such fiber composite shafts are used for example in compensate couplings as they are described in the DE 10 2006 042 301 A1. This being, the introduction of a torque into the fiber composite shaft takes place over the hole intrados of fixing openings configured on the flanges. However, fiber composite shafts can also be used to other purposes.

A method for manufacturing a hollow shaft with integral flanges made of fiber composite is known from the EP 0 443 470 A1. For this known method, a shaft portion as well as the flanges are produced from fiber material, whereby only the inner contour of the shaft portion is predetermined by a core. For forming the flanges, spreader disks with the shape of narrow plates travelling on the shaft portion are provided. When applying the windings, the fiber material is laid over the spreader disks and fixed beyond them. An additional fixing takes place on the circumference of the spreader disks. By laying the windings, an approximately conical portion is formed between the circumference of the spreader disks and the shaft portion. After the finishing of the windings, the fiber material is fixed in the area of the shaft portion by means of a form tool and cut outside the spreader disks. The conical portion is then put against the form tool in order to form a flange extending substantially in radial direction, for example by a displacement of the spreader disk. The spreader disk is then removed and replaced by a supporting tool. During the widening of the conical portion of the winding, it comes to a thinning of the fiber layer and thus to a reduction of the fiber layer thickness. This is taken into account for the configuration of the bearing surfaces on the form tool by appropriate inclinations. However, such inclinations constitute a problem for the purposes of use described above since then at least one side of a flange cannot be used directly as bearing surface. A fiber woven fabric which is just applied on the outer side of a flange can eventually be applied beforehand onto the bearing surface of the form tool. Moreover, the fact that it is necessary to displace the spreader disks during the manufacturing of a component makes the method complicated. Since the fibers of the fiber material are free of load when applying the conical portions to the form tool, the fiber structure is not optimal in the area of the flanges.

A further method for manufacturing a hollow shaft with integral flanges is known from the DE 195 44 008 A1. This being, there also result flanges with an outwards reduced wall thickness. These integral flanges are received in separate holders which finally make possible an axial connection.

Furthermore, a hollow shaft with integral wounded flange portions is known from the WO 98/20263 whereby the wall thickness reduction is compensated in radial direction by metallic closing plates.

Against this background, the aim of the invention is to indicate a method for manufacturing a hollow shaft with at least one integral flange made of fiber composite which makes possible a simple and cost-effective manufacturing, an uniform and defined fiber structure in the area of the flange(s) and which is flexible with respect to the configuration of the wall thickness of the flanges.

This aim is achieved by a method according to claim 1. For the method according to the invention for manufacturing a hollow shaft with at least one integral flange made of fiber composite, a plurality of intersecting windings of fiber material are deposited onto a core. The method is characterized in particular in that the core represents the inner contour of the shaft including the front wall of a flange for what purpose the core has, for each flange, a radial spreader ring with an axial bearing surface for giving the shape of a front wall of a flange as well as furthermore in that the windings are laid over an outer circumferential area of the respective spreader ring and fixed, one or several inserts made of fiber material are inserted in the area of the spreader ring between the windings, the fixing of the fiber material on the spreader ring is released after the finishing of the windings and portions of the windings are stripped from the outer circumferential area of the spreader ring over an edge by means of a stripper and are brought to rest on the axial bearing surface of the spreader ring in order to form a partial portion of a flange.

The method according to the invention uses a stationary core what reduces the expenditure of manufacturing equipment. Furthermore, the length of the hollow shaft can be adjusted in advance very exactly.

Since portions of the fiber material which are on the circumference of the stationary spreader ring are stripped over the spreader ring when laying the fiber material onto the bearing surface thereof, the laying takes place for all fiber windings under tension so that folds or winding portions partially free of load which could have a negative effect onto the strength properties of a flange are avoided. The fiber structure in the area of the flanges is thus improved.

Moreover, it should be considered that for the method according to the invention, depending on the configuration of the dimensions, portions of the windings which were first situated on the outer circumference of the spreader ring which is longish in axial direction can become a part of the later flange.

The wall thickness of the flanges can be adjusted as required by inserts of fiber material which are inserted during the applying of the windings. Moreover, the embedding between layers of windings improves the fiber structure in the flange.

Advantageous configurations of the invention are indicated in further patent claims.

Preferably the stripper is displaced in direction of the bearing surface of the stationary spreader ring, whereby it impinges a gusset formed between the spreader ring and the tapered portion of the fiber material. In an advantageous configuration, the spreader ring is a constituent of a multipart core which predetermines the inner contour of the hollow shaft including the corresponding front sides. For the length adjustment of the core, the spreader ring can be configured travelling with respect to a cylindrical portion which predetermines the inner contour of a shaft portion of the hollow shaft.

According to a further advantageous configuration of the invention, a spreader ring is used, the outer diameter of which increases in direction of the tapered portion of the fiber material or of the later shaft. As indicated above, the fiber material is fixed while applying the windings at its axial ends, for example by hooks or the like, directly on the spreader ring or else beyond the spreader ring. The latter however results in a greater material consumption so that a fixing directly on the spreader ring is to be preferred. Before laying the gusset against the bearing surface of the spreader ring, the fiber material must be separated from its fixing, for example by cutting-off the edge area of the fiber material. Due to the configuration of the outer circumference of the spreader ring with an increased diameter, for example in conical shape, the fiber material first remains held on the spreader ring. An undesired relief from load is thus avoided and it is guaranteed that the fibers are always stretched in the flange.

Preferably, after the finishing of the windings and before the release of the fixing of the wound fiber material at least in the area of the outer circumferential portion of the spreader ring, a circumferential layer is applied onto the windings. This layer serves for compacting and stabilizing the wound fiber material. In particular the seat on the outer circumferential portion is improved. This is advantageous for the subsequent stripping of the windings over the edge thereof.

According to a further advantageous embodiment of the invention, for forming the flanges inserts are used, the total thickness of which increases in direction of a fiber material end on the spreader ring. They are laid during the winding preferably on the conical portion and on the area of the windings on the outer circumference of the spreader ring. However, a local depositing only on the conical portion or on the outer circumference of the spreader ring is also possible. However, it is also basically conceivable to work without inserts, whereby flanges are obtained, the wall thickness of which decreases in radial direction.

In a preferred embodiment of the invention, the thickness of the insert(s) is adapted in such a manner that the corresponding flange has a constant wall thickness. Thus a rear side opposed to the front side of a flange can be used without further processing directly as a bearing surface for a fixing element acting in axial direction.

The inserts which are used can be configured for example as ring disk segments which are cut out from a fiber material mat.

According to an advantageous embodiment, a stitched insert in form of a ring disk is used. Stitched inserts offer the possibility of a further optimization of the fiber structure in the area of the flanges since, unlike to the aforesaid ring disk segments, the fiber orientation can be configured alike over the whole circumference of a flange. Strength non-homogeneities can thus be further reduced in the area of the flanges.

Preferably, one or several stitched ring disks are used which have a material thickness increasing outwards. They can be produced easily with known methods and can easily be manipulated. Due to the outwards increasing material thickness, the radial thinning of the fibers of the laid windings is countered. Alternatively or additionally, one or several stitched ring disks can be used which have an increasing deposit angle, whereby the deposit angle is defined as an angle between the fiber orientation on the ring disk and its radial direction. This too makes possible a compensation of the radial thinning which results from the laying of the windings.

Furthermore, the invention makes possible a hollow shaft of composite material according to claim 12 comprising one shaft portion and one or two integral flanges at the ends of the shaft portion. A hollow shaft according to the invention is characterized in that the shaft portions and the flange(s) have continued windings made of fiber material and in the area of the flange(s) one or several inserts made of fiber material are embedded between the windings in such a manner that the flange(s) has (have) a constant wall thickness. This being, the wall thickness of the flanges can be increased with respect to the wall thickness in the area of the hollow shaft. Not only a compensation of the decreasing wall thickness can be achieved by the inserts but also a general thickening of the flange can take place.

In an advantageous configuration, each flange has a front side and a rear side opposite this front side. This being, the front side and the rear side lie respectively in a plane which includes an angle of 90 degrees with the longitudinal central axis of the shaft portion. For an axial flanging against an opposite surface, a further processing of the front side and of the rear side of the flanges is basically not necessary. At the most, appropriate fixing bores still have to be built-in into the flanges and, if need be, the outer edge has to be smoothed.

According to a further advantageous embodiment, the fibers of the windings are stretched in the area of the flange(s). This is advantageous for the strength. Preferably, in addition to this, the flange(s) has a homogeneous fiber structure in circumferential direction.

A constant wall thickness is obtained by inserts which have an increasing thickness in radial direction and, if there are several inserts, which have an increasing total thickness. With respect to a homogeneous fiber structure, the insert(s) have preferably the shape of ring disks.

Moreover, a device for manufacturing a fiber composite shaft with integrated flanges is indicated.

The invention will be explained in detail below by means of an embodiment illustrated in the drawings.

Figure 1:
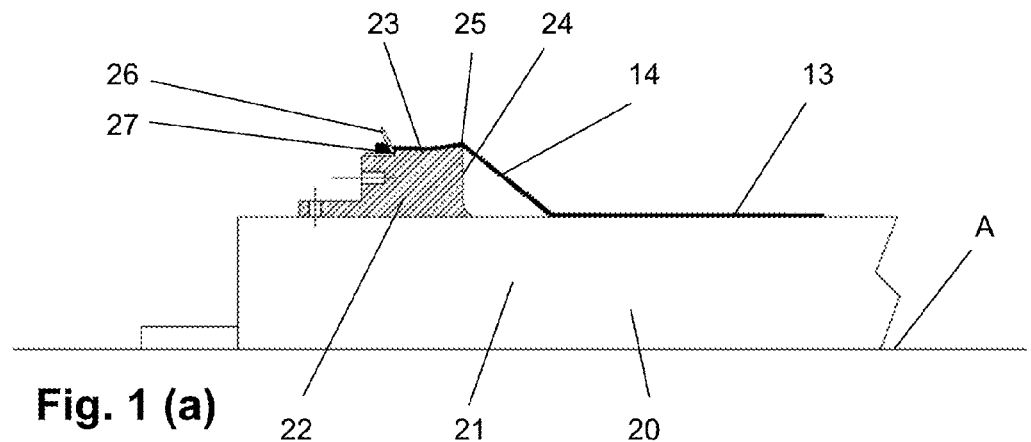
FIG. 1 shows a schematic representation of a method for manufacturing a shaft with an integrated flange made of fiber composite.
Figure 1:
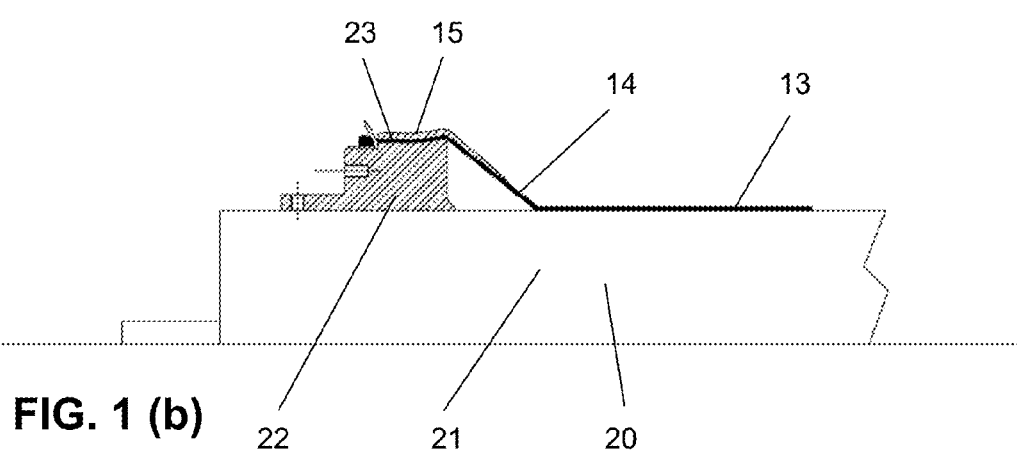
Figure 1:
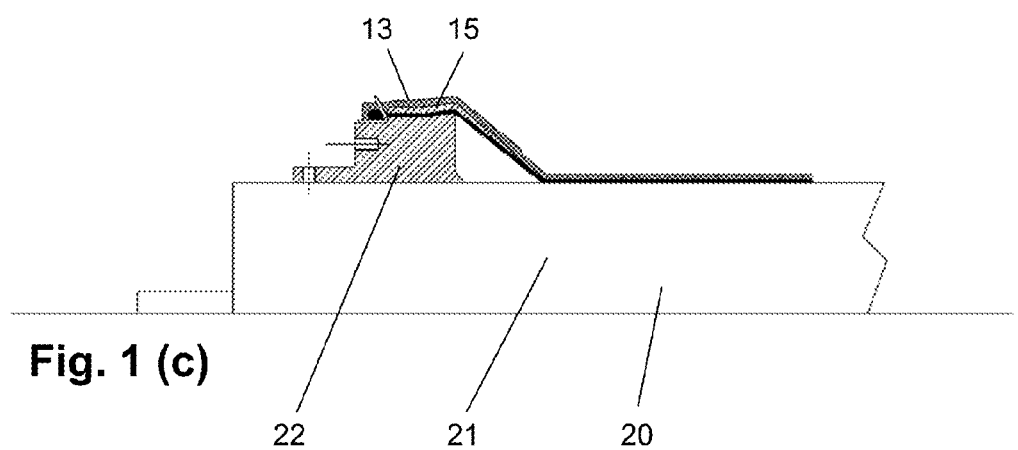
Figure 1:
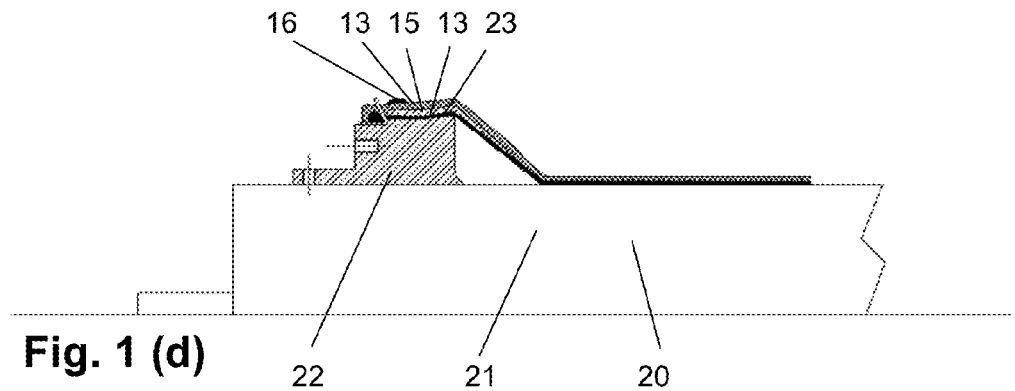
Figure 1:
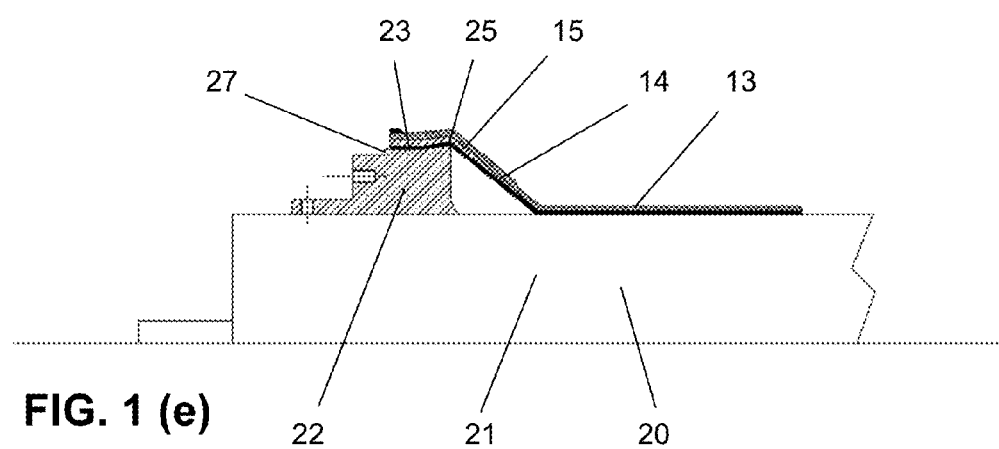
Figure 1:
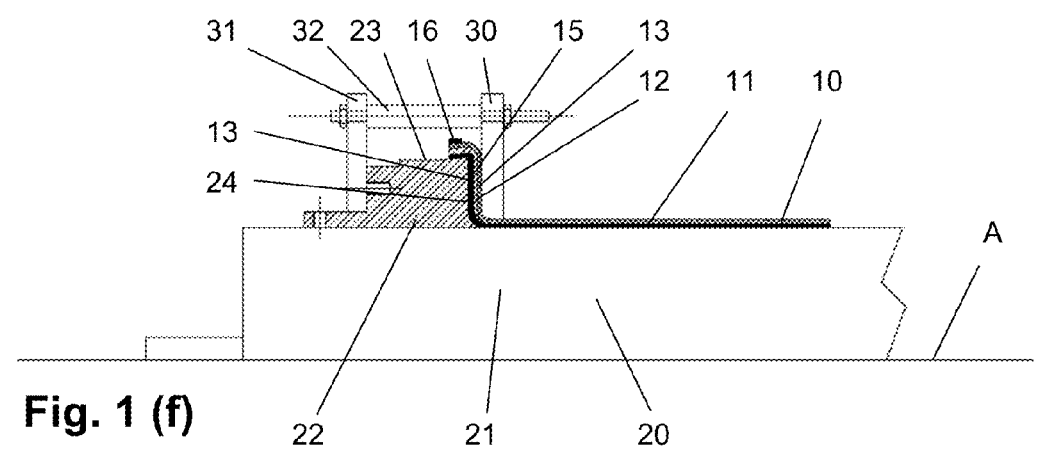

The partial portions (a) to (f) of FIG. 1 show the course of a method for manufacturing a hollow shaft 10 made of fiber composite in wound technique. The finished hollow shaft 10 comprises a shaft portion 11 and at least one integral flange 12 at one end of the shaft portion 11. The other end of the shaft portion 11 can on principle have any configuration. For example, an integral flange can also be provided there. The shaft portion 11 as well as the integral flange 12 are made of fiber composite, whereby the shaft portion 11 and the flange (s) 12 have continued windings of fiber material, i.e. have been wound in one operation.

In particular single fibers or fiber bundles or filament yarns or rovings of glass fibers, carbon fibers or other fibers, as they are usual for the manufacturing of fiber composite materials, are used. Thermosetting synthetic resins or elastomers which already adhere directly to the fiber material and thus which are applied when laying the windings or otherwise which are brought-in later into the ready wound fiber material are used as matrix.

In a first procedure step (1), first layers of intersecting windings 13 made of fiber material are applied onto a core 20 which represents the inner contour of the later hollow shaft 10. The core 20 has for the shaft portion 11 a cylindrical portion 21 and for each flange 12 of the later hollow shaft 10 a radially projecting spreader ring 22, the outer diameter of which is bigger than the outer diameter of the cylindrical portion 21. The core 20 can basically be configured in one part. However, for the illustrated embodiment, the core is made of several parts. The spreader ring 22 is displaceable with respect to the cylindrical portion 21 and it is positioned on the cylindrical portion for this purpose. Thus, the length of the core 20 can very easily be adjusted to manufacture hollow shafts with a different length. During the winding and laying of the fiber material on the core 20, the spreader ring 22 is stationary with respect to the cylindrical portion 21.

The spreader ring 22 has an outer circumferential portion 23 which, for the illustrated embodiment, has a diameter increasing in direction of the cylindrical portion 21. An axial bearing surface 24 is provided on the side turned to the cylindrical portion 21, bearing surface which defines the shape of a front wall of a flange 12. The bearing surface 24 runs in a plane vertically to the longitudinal axis A of the cylindrical portion 21 and forms with the outer circumferential portion 23 a pull-off edge 25, the function of which will still be explained in detail below. In an alternative of the embodiment, the outer circumferential portion 23 can also be designed with a constant diameter. Furthermore, there is a plurality of hooks 26 on the spreader ring 22 over which windings 13 of fiber material are laid and thus fixed on the core 20 or on the spreader ring 22. Thus, the inner contour of the shaft portion 11 continued with the front wall of the flange 12 is determined by the spreader ring 22 which is a constituent of the core 20 so that there thus results a stationary form tool for manufacturing a hollow shaft 10.

As shown in FIG. 1(a), the windings 13 are laid over the outer circumferential portion 23 of the spreader ring 22 and fixed to the hook 26. The hooks 26 are situated on a supporting ring which is supported axially on a shoulder 27 of the spreader ring 22. During the winding, an approximately conical gusset 14 is formed between the outer circumferential portion 23 and the cylindrical portion 21, gusset on which the windings 13 rest neither on the bearing surface 24 of the spreader ring 22, nor on the cylindrical portion 21.

During the applying of the windings 13, one or several inserts 15 made of fiber material are inserted, as shown in FIG. 1(b), in the area of the spreader ring 22 between the windings 13. The wall thickness is adjusted on the later flange 12 by the represented insert 15. In the illustrated embodiment, the insert 15 laps over the outer circumferential portion 23 of the spreader ring 22 as well as over the conical gusset 14 of the windings since both areas form partial portions of the flange 12 after laying the gusset 14 against the bearing surface 24.

Possible inserts are represented in detail in the FIGS. 2 to 5. Basically one or several inserts can be used, whereby a thickening of the flange 12 is obtained by the insert(s).

In a particularly advantageous embodiment alternative, the thickness of the insert(s) is adapted in such a way that the associated flange 12 has a constant wall thickness. In this case, there result a front side and a rear side on the flange 12 which are situated respectively in one plane which includes an angle of 90 degrees with the longitudinal central axis A of the cylindrical portion 21 or of the shaft portion 11. Inserts are used for this purpose, the total thickness of which increases in direction of a fiber material end on the spreader ring 22, i.e. here in direction of the hooks 26.

Figure 2:
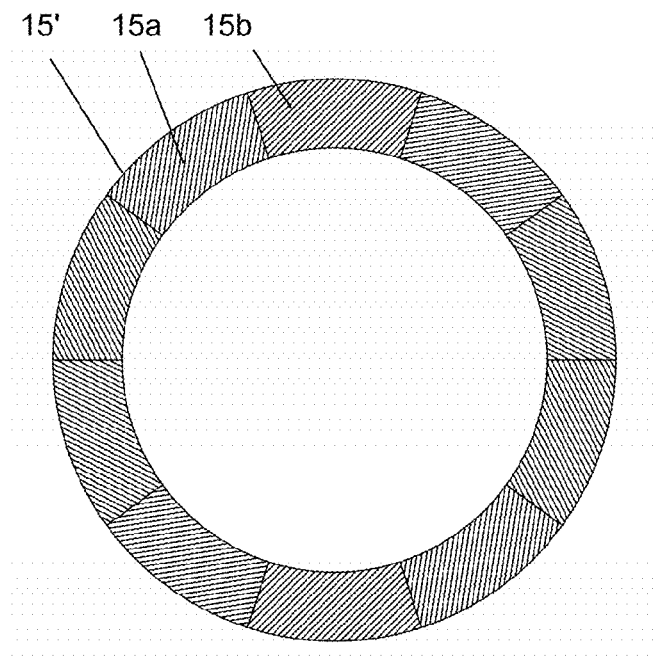
FIG. 2 shows a representation of the fiber structure of inserts in form of ring segments in viewing direction onto a flange.

FIG. 2 shows an insert 15' in the form of ring disk segments 15a, 15b. This being, the fiber structure of the ring disk segments 15a, 15b is indicated by hatches. The ring disk segments 15a, 15b are placed in such a manner that they have an orientation of the same kind of the fiber structure with respect to the radial direction. There thus results a certain homogenizing of the fiber structure on the flange in the circumferential direction.

Figure 3:
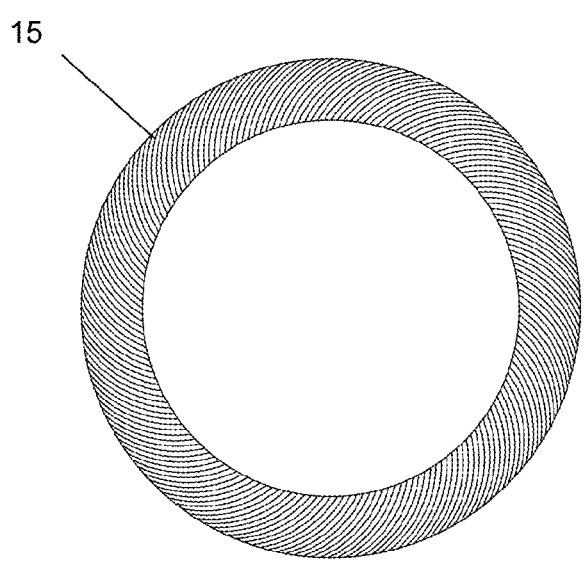
FIG. 3 shows a representation of the fiber structure of an insert in form of a stitched ring disk in viewing direction onto a flange.

A fiber structure which is still homogeneous in the circumferential direction can be achieved by means of a stitched insert 15 in the form of a ring disk according to FIG. 3. This being, the fiber structure is again indicated by hatches. An outwards increasing material thickness can be achieved by a stitched ring disk eventually by means of a single insert 15.

Figure 4:
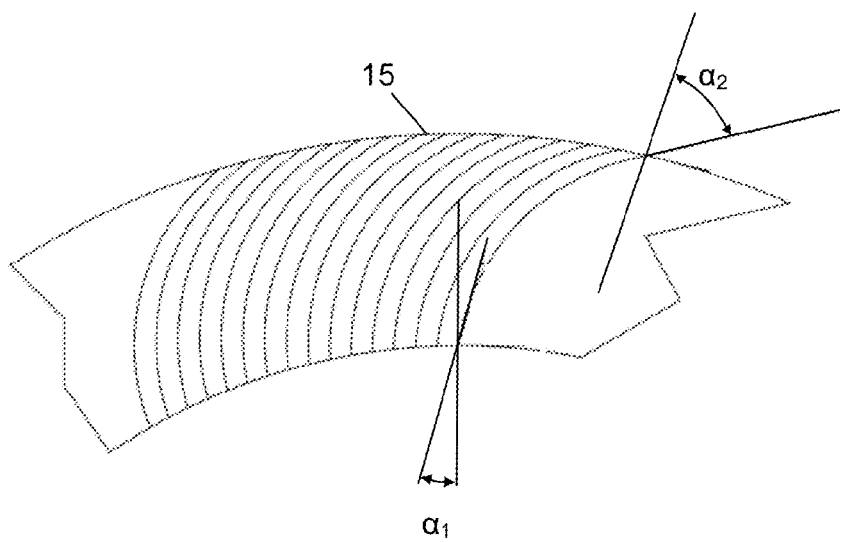
FIG. 4 shows a detail view of the insert of FIG. 3.

FIG. 4 shows a top view of a cutout of the insert 15 of FIG. 3 as it is obtained after the stitching which takes place in one plane. This being, the deposit angle α which is defined as an angle between the orientation of the fibers and the radial direction of the ring disk 15 has a smaller angle α1 on the inner edge and a bigger angle α2 on the outer edge. If the ring disk 15 is applied in the area of the conical portion 14 and of the outer circumferential portion 23, there results an outwards material thickening on the later flange 12 due to the increasing deposit angle.

Figure 5:
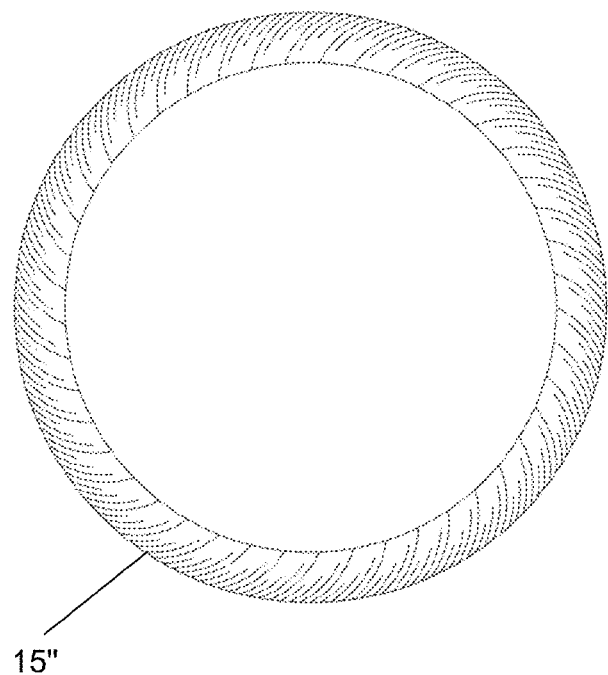
FIG. 5 shows a view of a further embodiment of an insert in form of a stitched ring disk.

FIG. 5 shows a further stitched insert 15" in ring disk form for which, as indicated by the hatches, a greater number of fibers per surface content is provided in the area of the outer edge than on the inner edge so that there is an outwards increasing material density and thickness.

After having applied the last windings in step (c), a circumferential layer 16 of fiber and/or elastomer material is wound in a further step (d) directly besides the fixing of the fiber material to the hook 26 with which the winding process is terminated. The circumferential layer 16 serves for compacting and stabilizing the wound fiber material in the area of the outer circumferential portion 23 of the spreader ring 22. The edge area with the hooks 26 is cut-off thereafter, as indicated in step (e). This being, a part of the circumferential layer 16 is cut-off too. Due to the outer diameter of the spreader ring 22 and of the circumferential layer increasing in direction of the pull-off edge 25 or of the cylindrical portion 21, the fiber material remains held in its position.

Then, in a further step (f), the portions of the windings which are situated on the outer circumferential area 23 of the spreader ring 22 are stripped over the edge 25 and applied against the axial bearing surface 24 of the spreader ring 22 in order to form a partial portion of a flange 12. This being, the area under the circumferential layer 26 remains however on the outer circumferential portion 23. Due to the pulling off over the edge 25, it is guaranteed that all the fibers remain stretched. This is advantageous for a homogeneous fiber structure. As shown in FIG. 1(f), the stripping of the outer circumferential portion 23 takes place by means of a stripper 30 which is displaced in direction of the bearing surface 24 of the spreader ring 22 which then remains stationary. The stripper 30 is formed by a divided block with a central opening, the diameter of which corresponds to the outer diameter of the wound shaft portion 11. During the displacement in direction of the bearing surface 24, the stripper 30 impinges the gusset 14 and first still lays it against the cylindrical portion 21 of the core 20 as well as finally against the bearing surface 24 of the core. For displacing the stripper 30 in direction of the spreader ring 22, a counter-support 31 is mounted on the latter, this counter-support being coupled to the stripper 30 by spindles 32. By rotating the spindles 32 which can be done manually or mechanically, the stripper 30 is drawn in direction of the bearing surface 24 until the wound fiber material completely rests on the core 20. The blank manufactured in this manner is then hardened for example by thermal effect and separated from the core 20. Finally fixing openings are drilled in the flanges 12. Additionally, the outer circumference of the flange 12 can be smoothed. On the other hand, a processing of the axial bearing surfaces in the flange area is not necessary.

Compared with traditional fiber composite shafts, the hollow shaft of fiber composite manufactured with the method explained above stands out by an improved fiber structure in the area of the flanges. Thus, the flanges have a very homogeneous fiber structure. Moreover the fibers of the windings are stretched in the area of the flanges without undulations. A formation of folds during the laying is avoided. Since the windings of the shaft portion 11 are continued in the flanges 12, there results a good connection of the flanges to the shaft portion 11. The wall thickness can be adjusted very flexibly to the flanges 12 by one or several inserts 15, 15' or 15" of fiber material which are preferably stitched. In particular a constant wall thickness is possible. The embedding between the windings assures a stable fiber compound.

Moreover, the method is characterized by a low expenditure of equipment. An axial adjusting possibility of the spreader rings 22 on the cylindrical portion 21 makes possible a simple adaptation to different axial lengths. However, since all the components of the core which are relevant for the inner dimensions as well as for the axial distance of the front sides of the shaft remain stationary during the winding of a shaft, the length of the shafts between the front sides of the flanges can be adjusted very exactly beforehand.

The invention has been explained in detail above by means of an embodiment. However, it is not limited hereto but comprises all the configurations defined by the claims.

What is claimed is:

1. Method for manufacturing a hollow shaft with at least one integral flange made of fiber composite comprising:
   depositing a plurality of intersecting windings of fiber material onto a core which represents the inner contour of a shaft portion, the core having for each flange a radial spreader ring with an axial bearing surface for defining the shape of a front wall of the flange;
   laying and fixing the windings over an outer circumferential portion of the respective spreader ring such that the windings form a gusset between the spreader ring and a substantially cylindrical surface of the core; and
   after the finishing of the windings, releasing the fixing of the wound fiber material and pulling off portions of the windings from the outer circumferential portion of the spreader ring over an edge of the spreader ring by means of a stripper wherein the stripper impinges the gusset, laying the fiber material of the gusset against the substantially cylindrical surface of the core as well as against the bearing surface of the spreader ring and wherein the fiber material is brought to rest on the axial bearing surface of the spreader ring thereby forming a partial portion of a flange.

2. Method according to claim 1, wherein after the finishing of the windings and before the releasing of the fixing of the wound fiber material, a circumferential layer is applied onto portions of the windings on the outer circumferential portion of the spreader ring for compacting and stabilizing the wound fiber material.

3. Method according to claim 1, wherein the stripper is displaced in direction of the bearing surface of the stationary spreader ring and acts on a gusset of the windings which is formed between the spreader ring and the shaft portion of the wound fiber material.

4. Method according to claim 1, wherein a spreader ring is used, the outer diameter of which increases in direction of the shaft portion of the wound fiber material or of the shaft.

5. Method according to claim 1, wherein one or several inserts are used, the total thickness of which increases in direction of a fiber material end on the spreader ring.

6. Method according to claim 1, wherein one or several inserts are used, the thickness of the one or several inserts is adapted in such manner that the corresponding flange has a constant wall thickness.

7. Method according to claim 1, wherein one or several inserts in the form of ring disk segments are used.

8. Method according to claim 1, wherein a stitched insert in the form of a ring disk is used.

9. Method according to claim 1, wherein one or several stitched ring disks are used as inserts, which have an outwards increasing material thickness.

10. Method according to claim 1, wherein one or several stitched ring disks are used as inserts, which have a deposit angle ($\alpha$) increasing from the inner side to the outer side, the deposit angle ($\alpha$) being defined as an angle between the fiber orientation on the ring disk and its radial direction.

11. Method according to claim 1, wherein the length of the hollow shaft is predetermined by a multipart core which has a cylindrical portion for predetermining the inner contour of a shaft portion and a spreader ring displaceable with respect hereto for defining the form of the front wall of a flange.

12. Method according to claim 1, further comprising placing one or several inserts made of fiber material in the area of the spreader ring between the windings.

* * * * *